United States Patent
Berg et al.

[11] Patent Number: 5,910,233
[45] Date of Patent: Jun. 8, 1999

[54] METHOD OF AND DEVICE FOR PRODUCING MINERALIZED DRINKING WATER

[76] Inventors: Gary Berg, 17 Heritage Blvd., Princeton, N.J. 08540; Dmitriy Taubman, 1208 Katchy Dr., Yadley, Pa. 19067; Jakov Verchivker, 50 Pastera St. #8, Odessa 270100, Ukraine

[21] Appl. No.: 08/908,595

[22] Filed: Aug. 8, 1997

[51] Int. Cl.⁶ .......................... B01D 15/00; B01D 24/00; B01D 39/00; C02F 1/04
[52] U.S. Cl. ................ 203/10; 202/202; 203/1; 210/264; 210/266; 210/295; 210/501
[58] Field of Search .................... 203/10, 1, 41, 203/40, 71, DIG. 17; 159/44, DIG. 2, DIG. 41; 202/200, 202, 197; 210/295, 416.3, 433.1, 501, 264, 266; 422/1

[56] References Cited

U.S. PATENT DOCUMENTS

| | | | |
|---|---|---|---|
| 369,877 | 9/1887 | Pacziga | 202/200 |
| 3,785,492 | 1/1974 | Mazza | 210/149 |
| 5,665,208 | 9/1997 | Giesselmann | 202/200 |

FOREIGN PATENT DOCUMENTS

| | | |
|---|---|---|
| 2409963 | 7/1979 | France . |
| 3612188 | 10/1987 | Germany . |
| 3707989 | 9/1988 | Germany . |
| 29615728 | 1/1997 | Germany . |
| 5026577 | 3/1981 | Japan . |
| 0082994 | 5/1984 | Japan . |
| 209294 | 10/1985 | Japan . |
| 2152587 | 7/1987 | Japan . |

*Primary Examiner*—Virginia Manoharan
*Attorney, Agent, or Firm*—Ilya Zborovsky

[57] ABSTRACT

For production of mineralized drinking water, water is distilled and then passed through a layer of soil which is taken from an area adjoining the source of natural mineral water.

3 Claims, 1 Drawing Sheet

METHOD OF AND DEVICE FOR PRODUCING MINERALIZED DRINKING WATER

BACKGROUND OF THE INVENTION

The present invention relates to a method of a device for producing mineralized drinking water.

Devices are known for stabilization of the composition of the drinking water during its condition. Such devices are disclosed in the publication "Complex Processing of Mineralized Water", A. T. Pilipenko, Kiev, Ukraine, 1984, and "Theoretical Foundation and Technology of Water Condition", L. A. Kulsky, Kiev Ukraine, 1983. In these devices, the water is filtered a marble aggregate or semi-burnt dolomite at the speed of 10–20 meters/hour. At that time, the following chemical reaction occurs:

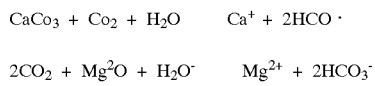

After the conditioning, the treated water is saturated with ions of Ca or Mg respectively. The existing conditioning devices of the above mentioned general type have the following disadvantages. It is necessary to provide a special preparation of filtering materials utilized in the device. There is a lack of complex ionization of the water being treated. Also, the device for conditioning of water has a considerable size.

SUMMARY OF THE INVENTION

Accordingly, it is an object of the present invention to provide a method of and a device for producing mineralized drinking water, which avoids the disadvantages of the prior art.

In keeping with these objects and with others which will become apparent hereinafter, one feature of the present invention resides, briefly stated, in a method for producing mineralized drinking water, in accordance with which water is distilled, and a distillate is then filtered through a layer of a soil adjoining a source of natural mineral water.

In accordance with another feature of present invention, a device for producing mineralized water is proposed, which includes means for distillation water; and a layer of a soil adjoining a source of natural mineral water through which the distilled water is filtered.

When the method is performed and the device is designed in accordance with the present invention, mineralized drinking water can be produced in a miniature device which allows to simultaneously saturate the water with a set of micro and macro elements without a complicated special treatment of the filtering material.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
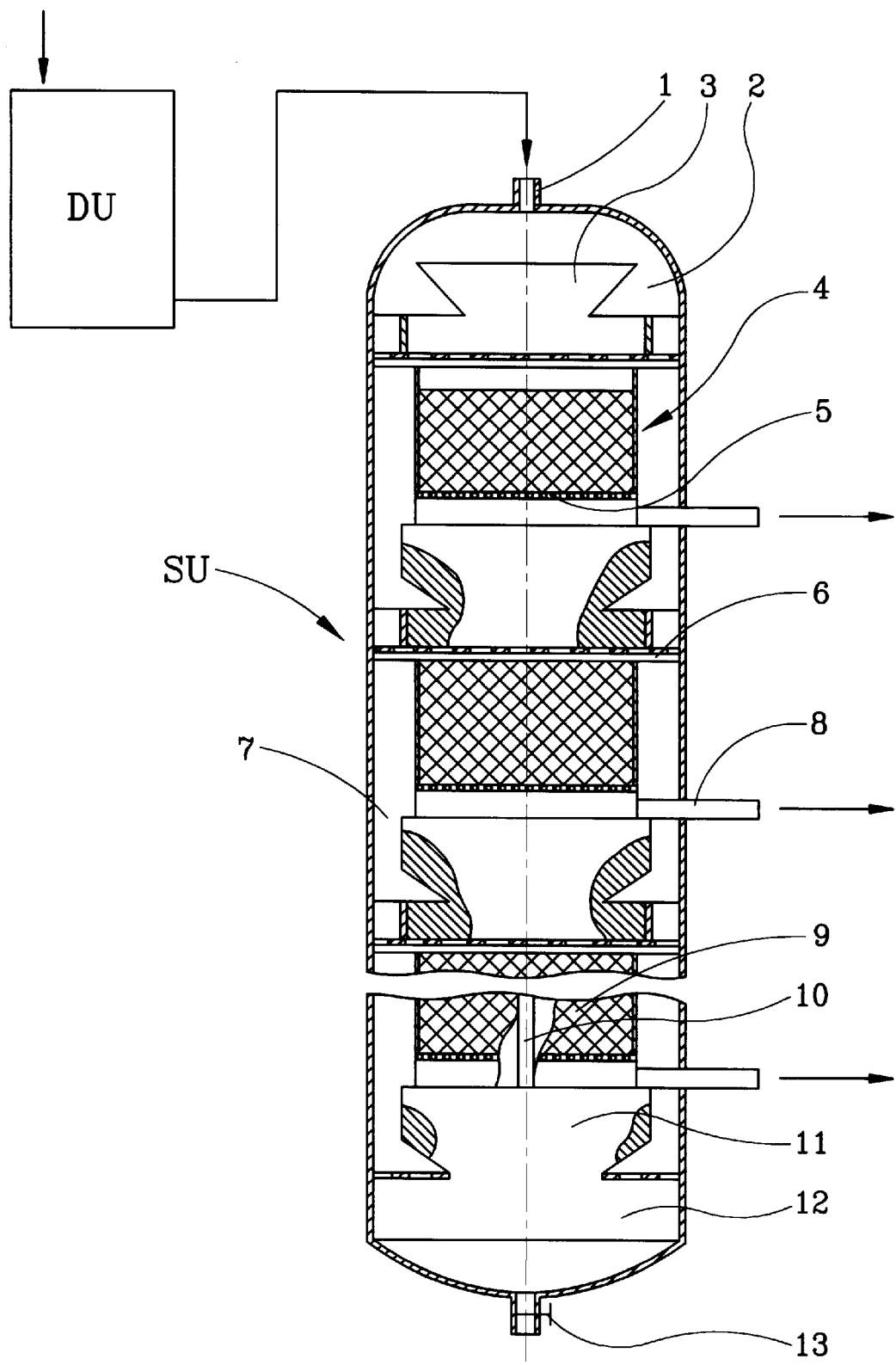
FIG. 1 of the drawings is a view schematically illustrating a method of and a device for producing mineralized drinking water in accordance with the present invention.

A device for producing mineralized drinking water in accordance with present invention has a distillation unit identified with reference DU and a saturation unit identified with reference SU. The water is first supplied into the distillation unit in which it is distilled by any known methods, for example by a membrane method which uses reverse osmotic membranes, and evaporative condenser method, etc. The distilled water is then supplied from the distillation unit into the saturation unit.

The saturation unit includes an inlet section 2 which is provided with an inlet pipe 1 and a swallow tail-type connection 3. The saturation unit further has a plurality of cassettes identified with the reference numeral 4. A flow distributor 6 is provided in the upper part of each cassette for a uniform distribution of the water being treated. A filtering layer of soil 5 is provided in each of the cassettes. In accordance with the invention, this layer is composed of a soil which adjoins a source of natural mineral water. Practically, it is taken from a region adjoining the source of natural mineral water and introduced as a layer into the cassette. A plurality of outlet pipes 8 are further provided in the saturation unit, and a bactericide sterilization gasket 9 is located in front of each outlet pipe 8. A bypass channel 7 inside each cassette supplies the distillate being treated to a following cassette. An outlet part of the saturation unit is identified with a reference numeral 12 and connected to the proceeding cassette by a swallow tail-type connection 11. The outlet part 12 is provided with a blow-off cock 13 for a sanitary treatment of interior surfaces of the device. The side surface of each cassette has a transparent scale 10 for indication of a level of the filtering material in the cassette.

The inventive method for producing mineralized drinking water in accordance with the present invention is performed in the inventive device in the following manner:

Water is first supplied into the distillation unit in which it is distilled. The distillate is supplied through the inlet pipe 1 into a chamber of the inlet part 2 of the saturation unit, onto the flow distributor 6 of the cassette 4 which is the first cassette in direction of movement of water. The flow of distillate is supplied onto the surface of the filtering soil layer 5 in the cassette, and also flows into the bypass channel 7 to the subsequent cassette as considered in the direction of movement so as to fill up their chambers as well. If a cock in any of the outlet pipes 8 is open, the water with the corresponding mineral composition is withdrawn from the device. Since the mineralized water flows into the outlet pipes 8 through the sterilization 9 prior to its withdrawal from the device, the produced mineralized drinking water has a micro biological stability. The transparent scale 10 makes possible checking of whether the filtering cassettes are still fit to use. After passing the corresponding cassette, the water is saturated with the ions typical the particular mineral water, of the soil layer of which is located in the filter. The performed experiments have shown that the physical-chemical parameters of the produced mineralized water are practically identical to the corresponding natural mineral water.

When the filtering cassette has been used as determined by observation of the transparent scale with an indicator on its side surface, the corresponding cassette can be removed from the separation unit. It is to be understood that a layer of soil located in each of the cassettes is selected so as to produced mineralized water with correspondingly desired physical-chemical parameters, and therefore the soil for this layer is selected from an area which adjoins a source of natural mineral water with the same physical-chemical parameters. No specific compositions of such soils and specific parameters are given herein, since they are selected in correspondence with desires of an individual producer of mineralized water.

It will be understood that each of the elements described above, or two or more together, may also find a useful application in other types of methods constructions differing from the types described above.

While the invention has been illustrated and described as embodied in method of and device for producing mineralized drinking water, it is not intended to be limited to the details shown, since various modifications and structural changes may be made without departing in any way from the spirit of the present invention.

Without further analysis, the foregoing will so fully reveal the gist of the prsent invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for producing mineralized drinking water, comprising means for distilling a water; means for filtering the distilled water through at least one layer of soil which is taken from at least one area adjoining a source of natural mineral water so as to saturate the distilled water with ions of the natural mineral water to thereby produce the mineralized drinking water; said filtering means comprising cassettes accommodating the at least one layer of soil so that the distilled water passes through the cassettes and therefore through the at least one layer of soil accommodated in the cassettes so as to exit as the mineralized drinking water said cassettes, said cassettes being removably connectable with one another, a bactericidal element arranged so that the mineralized drinking water exiting the cassette; passes through said bactericidal element prior to use of the mineralized drinking water so as to provide a bactericide sterilization of the mineralized drinking water; means for individually withdrawing the mineralized water from a respective one of said cassettes and including a plurality of outlet pipes extending from a respective one of said cassettes and each provided with an openable closure; and means for checking whether a corresponding one of the cassettes is still fit to use.

2. A device as defined in claim 1, wherein the at least one layer of soil is a plurality of layers of soil taken from a plurality of areas adjoining difference sources of natural mineral water.

3. A method of producing mineralized drinking water, comprising the steps of distilling a water; filtering the distilled water through a plurality of layers of soil taken from at least one area adjoining a source of natural mineral water, so as to saturate the distilled water with ions of the natural mineral water by passing the distilled water through the plurality of the layers of soil accommodated in a plurality of cassettes located one after the other and communicating with one another so that the distilled water flows from one cassette to the other cassette through the layers of a soil; withdrawing the mineralized drinking water from any of the cassettes; passing the thusly produced distilled water saturated with the ions of the natural mineral water through a bactericidal sterilization gasket after exiting from any of said cassettes; and checking whether a corresponding one of the cassettes is still fit to use.

\* \* \* \* \*